United States Patent
Shah et al.

(10) Patent No.: US 11,751,168 B2
(45) Date of Patent: Sep. 5, 2023

(54) METHODS FOR HANDLING ANOMALY NOTIFICATION MESSAGES

(71) Applicant: QUALCOMM Incorporated, San Diego, CA (US)

(72) Inventors: Abhi Umeshkumar Shah, San Diego, CA (US); Rajashekar Chilla, San Diego, CA (US); Alan Soloway, Erie, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/064,622

(22) Filed: Dec. 12, 2022

(65) Prior Publication Data

US 2023/0111567 A1    Apr. 13, 2023

Related U.S. Application Data

(62) Division of application No. 17/229,569, filed on Apr. 13, 2021, now Pat. No. 11,558,850.

(51) Int. Cl.
| | | |
|---|---|---|
| *H04M 11/04* | (2006.01) | |
| *G08C 17/00* | (2006.01) | |
| *H04N 7/18* | (2006.01) | |
| *G01C 3/08* | (2006.01) | |
| *H04W 68/02* | (2009.01) | |
| *H04L 41/142* | (2022.01) | |
| *H04W 40/02* | (2009.01) | |
| *H04W 4/90* | (2018.01) | |
| *H04W 4/20* | (2018.01) | |
| *H04W 4/70* | (2018.01) | |

(52) U.S. Cl.
CPC .......... *H04W 68/02* (2013.01); *H04L 41/142* (2013.01); *H04W 4/20* (2013.01); *H04W 4/70* (2018.02); *H04W 4/90* (2018.02); *H04W 40/02* (2013.01)

(58) Field of Classification Search
CPC ......... H04W 68/02; H04W 4/70; H04W 4/90; H04W 4/20; H04W 40/02; H04L 41/142
USPC ....................................................... 455/404.2
See application file for complete search history.

(56) References Cited

U.S. PATENT DOCUMENTS

| | | |
|---|---|---|
| 2015/0071139 A1 | 3/2015 | Nix |
| 2016/0234686 A1 | 8/2016 | Bone et al. |
| 2016/0321125 A1 | 11/2016 | Kang et al. |
| 2017/0041752 A1 | 2/2017 | Baek et al. |
| 2017/0318445 A1 | 11/2017 | Kodaypak et al. |
| 2017/0345238 A1 | 11/2017 | Savolainen |
| 2018/0301018 A1 | 10/2018 | Seifer et al. |
| 2020/0366563 A1 | 11/2020 | Patil et al. |
| 2021/0011159 A1 | 1/2021 | Woo et al. |
| 2021/0385753 A1 | 12/2021 | Kontio et al. |
| 2022/0183607 A1 | 6/2022 | Volosin et al. |
| 2022/0330204 A1 | 10/2022 | Shah et al. |

*Primary Examiner* — Mark G. Pannell
(74) *Attorney, Agent, or Firm* — The Marbury Law Group, PLLC

(57) ABSTRACT

In systems and methods for processing an anomaly notification message, a communication network device may receive from a wireless device an anomaly notification message, and in response to determining that the anomaly notification message was received via the anomaly-specific network communication link may associate the anomaly notification message with an anomaly priority that is higher than a normal traffic priority.

12 Claims, 11 Drawing Sheets

500a

| ID | Name | Operations | Instances | Mandatory | Type | Range or Enumeration | Units | Description |
|---|---|---|---|---|---|---|---|---|
| 31 | Emergency Port | RW | Single | Optional | Integer | 1..65534 | | Emergency Port can be used for Emergency message delivery |

| | 0.05 | EMERGENCY-GET |
|---|---|---|
| Method Codes For Emergency Operations | 0.06 | EMERGENCY-POST |
| | 0.07 | EMERGENCY-PUT |
| | 0.08 | EMERGENCY-DELETE |

| Option Number | 128 | Emergency |
|---|---|---|

FIG. 5B

METHODS FOR HANDLING ANOMALY NOTIFICATION MESSAGES

RELATED APPLICATIONS

This application is a divisional of U.S. patent application Ser. No. 17/229,569 entitled "METHODS FOR HANDLING ANOMALY NOTIFICATION MESSAGES" filed Apr. 13, 2021, the contents of which are incorporated herein by reference for all purposes.

BACKGROUND

Wireless communication systems, such as Long Term Evolution (LTE) Fifth Generation (5G) New Radio (NR) and other communication technologies, enable the deployment of wireless devices that may be equipped with a sensor to detect and report anomalous conditions, such as anomalous temperature, pressure, humidity, conditions such as fires, the presence of chemicals such as carbon monoxide, an intruding person or animal, and other such conditions. Wireless devices and communication networks should be appropriately configured to handle such notification messages so that their transport and delivery is not impeded by network congestion and other network conditions.

SUMMARY

Various aspects include methods and wireless devices configured to perform the methods for communicating an anomaly notification message to a wireless communication network. Various aspects may include determining whether information received from one or more sensors of the wireless device satisfies one or more threshold criteria indicative of an anomaly condition, generating an anomaly notification message comprising an anomaly notification object in response to determining that the received information satisfies one or more threshold criteria indicative of the anomaly condition, configuring the anomaly notification message with a transport layer anomaly code, and sending the configured anomaly notification message via an anomaly-specific network communication link to a wireless communication network.

In some aspects, the anomaly notification object may include a Lightweight Machine-to-Machine (LwM2M) object. Some aspects may include receiving from the wireless communication network an object indicating an anomaly communication port. In such aspects, sending the configured anomaly notification message via the anomaly-specific network communication link to the wireless communication network may include sending the configured anomaly notification message via the anomaly-specific network communication link using the anomaly communication port to the wireless communication network.

In some aspects, the transport layer anomaly code may include a Constrained Application Protocol (CoAP) emergency code. Some aspects may include receiving from the wireless communication network a request for information including a transport layer anomaly request code. In such aspects, configuring the anomaly notification message with a transport layer anomaly code may include configuring the anomaly notification message with a transport layer anomaly response code. In some aspects, sending the configured anomaly notification message via an anomaly-specific network communication link to the wireless communication network may include sending the configured anomaly notification message via an anomaly-specific packet data connection (PDC) to the wireless communication network.

Further aspects include a wireless device having a processor configured with processor-executable instructions to perform operations of any of the methods summarized above. Various aspects include a non-transitory processor-readable medium having stored thereon processor-executable instructions configured to cause a processor of a wireless device to perform operations of any of the methods summarized above. Various aspects include a wireless device having means for performing functions of any of the methods summarized above.

Various aspects include methods and communication network devices configured to perform the methods for processing an anomaly notification message. Some aspects may include receiving from a wireless device an anomaly notification message including an anomaly notification object, determining whether the anomaly notification message was received via an anomaly-specific network communication link, and associating the anomaly notification message with an anomaly priority that is higher than a normal traffic priority in response to determining that the anomaly notification message was received via the anomaly-specific network communication link.

In some aspects, associating the anomaly notification message with an anomaly priority that is higher than a normal traffic priority may include routing the anomaly notification message according to the anomaly priority. In some aspects, the wireless device may be an anomaly detection device configured to generate the anomaly notification object as a Lightweight Machine-to-Machine (LwM2M) object.

Some aspects may include sending to the wireless device an object indicating an anomaly communication port for use in communicating anomaly notification messages. In such aspects, receiving from the wireless device the anomaly notification message including an anomaly notification object may include receiving the anomaly notification message via the anomaly communication port. Some aspects may include sending to the wireless device a request for the anomaly notification message, the request including a transport layer anomaly request code. In such aspects, receiving from a wireless device an anomaly notification message including an anomaly notification object may include receiving the anomaly notification message configured with a transport layer anomaly response code. In some aspects, determining whether the anomaly notification message was received via an anomaly-specific network communication link may include determining whether the anomaly notification message was received via an anomaly-specific packet data connection (PDC).

Further aspects include a communication network device having a processor configured with processor-executable instructions to perform operations of any of the methods summarized above. Various aspects include a non-transitory processor-readable medium having stored thereon processor-executable instructions configured to cause a processor of a communication network device to perform operations of any of the methods summarized above. Various aspects include a communication network device having means for performing functions of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

FIG. 5A illustrates aspects of an example anomaly port object according to various embodiments.

FIG. 5B illustrates transport layer anomaly codes according to various embodiments.

DETAILED DESCRIPTION

Figure 1:
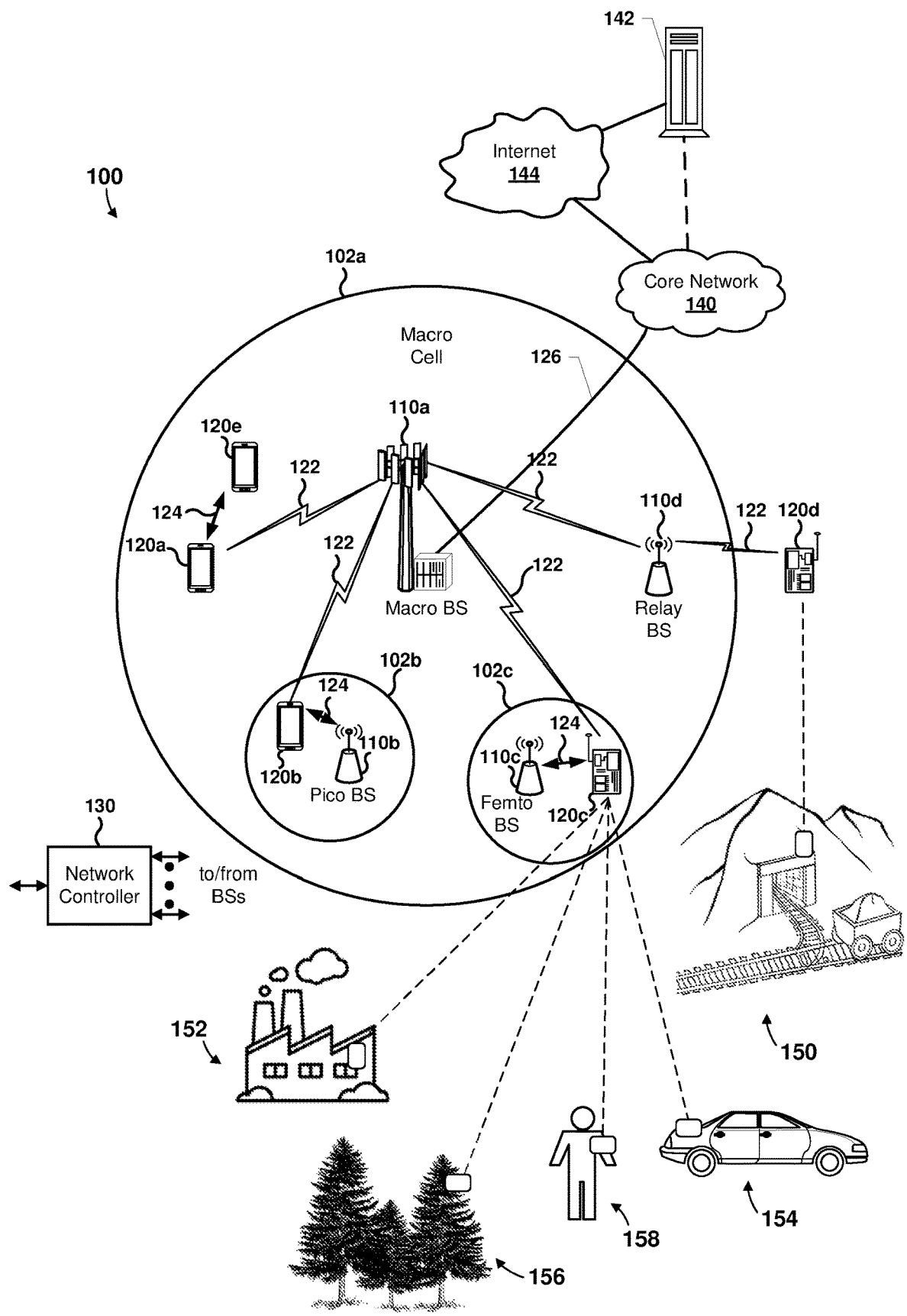
FIG. 1 is a system block diagram illustrating an example wireless network suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include wireless devices and network communication devices configured to send and receive anomaly notification messages, such as emergency messages, in a manner that prioritizes the transport and/or delivery of such messages over normal or non-prioritized message traffic. Various embodiments enable wireless devices in network communication devices to handle such anomaly notification messages to mitigate or overcome network congestion and other network conditions that may delay or prevent the transport or delivery of normal or non-prioritized traffic, thereby enabling critical anomaly and emergency messages to be timely delivered.

The term "wireless device" is used herein to refer to any of a variety of devices including a processor and transceiver for communicating with other devices or a network. The term "wireless device chipset" is used herein to refer to a processor and communication chip assembly, system-on-chip, or system-in-package that is configured to be implemented in a wireless device and includes a processor and communication circuitry configured to perform operations of various embodiments. For example, a wireless device may include at least one wireless chipset as well as a power source, sensors, interfaces for connecting to sensors, a wireless antenna, and other components. For ease of description, examples of wireless devices are described as communicating via radio frequency (RF) wireless communication links, but wireless devices may communicate via wired or wireless communication links with another device (or user), for example, as a participant in a wireless communication network, such as a cellular wireless communication network, a wide area network, any wireless communication network supporting the Internet of Things (IoT), a wireless mesh network of multiple wireless devices (or other devices such as smoke detectors), or any other suitable communication system. Such communications may include communications with another wireless device, a base station (including a cellular wireless communication network base station and an IoT base station), an access point (including an IoT access point), or other wireless devices.

Wireless devices may be capable of transmitting and receiving RF signals according to any of the Institute of Electrical and Electronics Engineers (IEEE) 16.11 standards, or any of the IEEE 802.11 standards, the Bluetooth standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular, or IoT network, such as an IEEE 802.15.4 protocol (for example, Thread, ZigBee, and Z-Wave), 6LoWPAN, Bluetooth Low Energy (BLE), LTE Machine-Type Communication (LTE MTC), Narrow Band LTE (NB-LTE), Cellular IoT (CIoT), Narrow Band IoT (NB-IoT), BT Smart, Wi-Fi, LTE-U, LTE-Direct, and MuL-TEfire, as well as relatively extended-range wide area physical layer interfaces (PHYs) such as Random Phase Multiple Access (RPMA), Ultra Narrow Band (UNB), Low Power Long Range (LoRa), Low Power Long Range Wide Area Network (LoRaWAN), Weightless, or a system utilizing 3G, 4G or 5G radio access technologies (RATs), or any further implementations thereof. Wireless devices also may be capable of transmitting and receiving signals using a wired communication link according to any suitable communication protocol, such as Ethernet, Recommended Standard (RS)-232, RS-485, Universal Asynchronous Receiver/Transmitter (UART), Universal Synchronous and Asynchronous Receiver/Transmitter (USART), Universal Serial Bus (USB), or any other suitable communication protocol.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single IoT device. The proximity of the SOCs facilitates high speed communications and the sharing of memory and resources.

The various embodiments are described herein using the terms "server" and "network server" to refer to any computing device capable of functioning as a server, such as a master exchange server, web server, mail server, document server, content server, or any other type of server. A server may be a dedicated computing device or a computing device including a server module (e.g., running an application that may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

In the Lightweight Machine-to-Machine (LwM2M) protocol, such as the LwM2M protocol defined according to the Open Mobile Alliance (OMA) LwM2M version 1.1 specification, the LwM2M object design enables wireless devices to conserve limited battery power and processing capability by sending small messages that are indexed to or include an identifier, index or other link to more complex information known to the receiving device. For example, the LwM2M protocol uses a tree with a depth of four, including Objects, which have Object Instances and Resources. The Resources, which are located in Object Instances, have Resource Instances. In some implementations, each Object, Object Instance, Resource, and Resource Instance may be indicated with a 16-bit identifier (an Object ID, Object Instance ID, Resource ID, and Resource Instance ID, respectively).

The Constrained Application Protocol (CoAP) is a network transport protocol designed for use by resource-constrained wireless devices, such as wireless sensor devices, over unreliable, lossy communication links. Such resource-constrained devices typically are configured with relatively limited processing power, memory, and power supplies. Some aspects of CoAP are standardized by the Internet Engineering Task Force (IETF), such as in RFC 7252. CoAP is designed for integration with larger communication networks that may use other protocols (such as Hypertext Transfer Protocol (HTTP)) while meeting certain needs of resource-constrained wireless.

Various embodiments include wireless devices and network communication devices configured to send and receive anomaly notification messages in a manner that prioritizes the transport and/or delivery of such messages over normal or non-prioritized message traffic. An anomaly notification message may provide an alert or notification about a potentially urgent or emergency condition, or about a condition that is not currently an emergency but could indicate, lead to, or become an emergency. For example, a smoke detection notification from a smoke detector device in a kitchen may indicate a fire, or may indicate the presence of burned food, or may indicate another condition. In any such condition, the smoke detector device may send an anomaly notification message indicating the detection of smoke. As another example, a water detection notification from a water detector device in a bilge area of a boat may indicate a potentially important condition (the presence of water in the bilge), which could indicate an emergency situation but may not necessarily be an emergency condition or even a condition that requires urgent action. In both examples, the anomaly may not be an emergency situation but requires urgent investigation to make that determination or head off an emergency, and therefore timely delivery of the anomaly notification message from the sensor is important.

Conventionally, anomaly notification messages sent by wireless devices and received and transported by network communication devices are configured as confirmable (CON) or non-confirmable (NON-COM) messages with normal or regular priority. If the communication network is congested, messages having a normal or regular priority may be delayed in routing or transport, or in some cases may be dropped. Anomaly notification messages should be handled in a manner that mitigates or reduces a delay in routing or network transport.

Various embodiments include methods and wireless devices and network communication devices configured to perform the methods for communicating an anomaly notification message. In some embodiments, a processor of a wireless device may determine whether information received from one or more sensors of the wireless device satisfies one or more threshold criteria indicative of an anomaly condition, generate an anomaly notification message including an anomaly notification object in response to determining that the received information satisfies one or more threshold criteria indicative of the anomaly condition, configure the anomaly notification message with a transport layer emergency code, and send the configured anomaly notification message via an emergency-specific network communication link to a wireless communication network. In some embodiments, the wireless device may configure the anomaly notification message with an anomaly priority that is higher than a normal traffic priority. A message having an anomaly priority may be handled, routed, and/or transported by network communication devices preferentially over messages having a normal or regular priority. In some embodiments, the anomaly notification object may include an LwM2M object. In some embodiments, the transport layer anomaly code comprises a CoAP emergency code.

In some embodiments, a network communication device (such as a bootstrap server or another suitable server) may provide configuration information to a wireless device, for example, during a bootstrapping operation. In some embodiments, the wireless device may receive from the wireless communication network an object indicating an anomaly communication port. In some embodiments, such information may be included in a LwM2M object such as a Security object (e.g., Object ID 0). In some embodiments, the wireless device may store such information in a secure memory location, such as a trust zone. In such embodiments, the wireless device may send the configured anomaly notification message via the anomaly-specific network communication link using the anomaly communication port to the wireless communication network. In some embodiments, the wireless device may send, and the communication network device may receive, the anomaly notification message via the anomaly communication port. In some embodiments, the wireless device and/or the communication network device also may use a normal or regular communication port for sending and receiving of anomaly notification messages.

In some embodiments, the wireless device may receive from the communication network device a request for information including a transport layer anomaly request code. In some embodiments, the wireless device may configure an anomaly notification message with a transport layer anomaly response code. In some embodiments, the wireless device and/or communication network device may be configured to use transport layer anomaly codes. For example, transport layer anomaly codes may include CoAP emergency codes such as "EMERGENCY-GET," "EMERGENCY-POST," "EMERGENCY-PUT," "EMERGENCY-DELETE," an Option Number, such as CoAP Option Number 128, and/or another suitable anomaly code. In some embodiments, the wireless device may send, and the communication network device may receive, an anomaly notification message that is configured with a transport layer anomaly response code.

In some embodiments, the communication network device may send to the wireless device a query, request, or instruction to provide information, in which the query, request, or instruction may include or be configured with a transport layer anomaly code. In some embodiments, the wireless device may receive from the communication network device the query, request, or instruction to provide information that is configured with a transport layer anomaly code, and in response the wireless device may send the information in a message that is configured with a transport layer code.

In some embodiments, the wireless device may send, and the communication network device may receive, a configured anomaly notification message via an anomaly-specific packet data connection (PDC) to the wireless communication network. In some embodiments, an anomaly-specific PDC may include an anomaly-specific quality of service (QoS).

In some embodiments, a communication network device may receive from a wireless device an anomaly notification message (e.g., including an anomaly notification object), and may determine whether the anomaly notification message was received via an anomaly-specific network communication link. In some embodiments, the communication network device may determine whether the anomaly notification message was received via an anomaly-specific PDC. In response to determining that the anomaly notification message was received via the anomaly-specific network communication link, the communication network device may associate the anomaly notification message with an anomaly priority that is higher than a normal traffic priority. In some embodiments, associating the anomaly notification message with an anomaly priority that is higher than a normal traffic priority may include routing the anomaly notification message according to the anomaly priority.

FIG. 1 illustrates an example wireless network 100 suitable for use with various embodiments. The wireless network 100 includes a number of base stations 110a-110d and other network entities. Some base stations (e.g., 110a) may be connected to a core network 140, such as by wired communication link 126, and the core network may provide access (e.g., via Internet protocol communications) to a remote server 142 that provides emergency services through direct communication links 144 and/or via an intermediate network, such as the Internet 144. The base stations 110a-110d may provide access to the wireless network 100 to a variety of wireless devices 120a-120e (for example, mobile communication device 120a, 120b, and 120e, and wireless devices 120c and 120d) via wireless communication links 122. Each base station 110a-110d may provide communication coverage for a particular geographic area. In 3rd Generation Partnership Project (3GPP), the term "cell" may refer to a coverage area of a Node B and/or a Node B subsystem serving this coverage area, depending on the context in which the term is used. In new radio (NR) or Fifth Generation (5G) network systems, the term "cell" and eNB, Node B, 5G NB, access point (AP), NR base station, NR base station, or transmission and reception point (TRP) may be interchangeable. In some examples, a cell may not necessarily be stationary, and the geographic area of the cell may move according to the location of a mobile base station. In some embodiments, the base stations 110a-110d may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support one or more RATs and may operate on one or more frequencies. A frequency may also be referred to as a carrier, a frequency channel, a frequency band, etc. Each frequency may support a single radio access technology (RAT) in a given geographic area in order to avoid interference between wireless networks of different RATs. The wireless network 100 supporting wireless device communications may use or support a number of different RATs in wireless communication links 122 or 124, including for example, LTE/Cat. M, NB-IoT, Global System for Mobile Communications (GSM), and Voice over Long Term Evolution (VoLTE) RATs as well as other RATs (e.g., 5G). The wireless network 100 may use a different access point name (APN) for each different RAT.

A base station 110a-110d may provide communication coverage for a variety of cell types, such as a macro cell 102a, a pico cell 102b, a femto cell 102c, and/or other types of cells via wireless communication links 124. A macro cell (e.g., 102a) may cover a relatively large geographic area (e.g., several kilometers in radius) and may allow unrestricted access by wireless devices with a service subscription. A pico cell (e.g., 102b) may cover a relatively small geographic area and may allow unrestricted access by wireless devices with service subscription. A femto cell (e.g., 102c) may cover a relatively small geographic area (e.g., a home) and may allow restricted access by wireless devices having association with the femto cell (e.g., wireless devices in a Closed Subscriber Group (CSG), wireless devices for users in a home, etc.). A base station for a macro cell may be referred to as a macro base station (e.g., 110a). A base station for a pico cell may be referred to as a pico base station (e.g., 110b). A base station for a femto cell 102c may be referred to as a femto base station or a home base station (e.g., 110c). In the example shown in FIG. 1, the base stations 110a, 110b and 110c may be macro base stations for the macro cells 102a, 102b and 102c, respectively. A base station may support one or multiple cells. Further, base stations may support communication links 124 on multiple networks using multiple RATs, such as Cat.-M1, NB-IoT, GSM, and VoLTE.

The wireless network 100 may also include relay stations (e.g., 110d). A relay station is a station that receives a transmission of data and/or other information from an upstream station (e.g., a base station or an IoT device) and sends a transmission of the data and/or other information to a downstream station (e.g., an IoT device or a base station). A relay station may also be a wireless device that relays transmissions for other wireless devices including IoT devices. In the example shown in FIG. 1, the relay station 110d may communicate with the base station 110a and the wireless device 120d in order to facilitate communication between the base station 110a and the wireless device 120d. A relay station may also be referred to as a relay base station, a relay, etc. Further, relay stations may support communications on multiple networks using multiple RATs, such as Cat.-M1, NB-IoT, GSM, and VoLTE.

The wireless network 100 may be a heterogeneous network that includes base stations of different types, e.g., macro base station, pico base station, femto base station, relays, etc. These different types of base stations may have different transmit power levels, different coverage areas, and different impact on interference in the wireless network 100. For example, macro base station may have a high transmit power level (e.g., 20 watts) whereas pico base station, femto base station, and relays may have a lower transmit power level (e.g., 1 watt).

The wireless network 100 may support synchronous or asynchronous operation. For synchronous operation, the base stations 110a-110d may have similar frame timing, and transmissions from different base stations may be approximately aligned in time. For asynchronous operation, the base stations 110a-110d may have different frame timing, and transmissions from different base stations may not be aligned in time. The techniques described herein may be used for both synchronous and asynchronous operations.

A network controller 130 may be coupled to a set of base stations (e.g., 110a-110d) and provide coordination and control for these base stations. The network controller 130 may communicate with the base stations 110a-110d via a wired or wireless backhaul communication link. The base stations 110a-110d may also communicate with one another, e.g., directly or indirectly via a wireless or wired backhaul communication link.

In various embodiments, wireless devices (e.g., 120c and 120d) may be configured to detect potential or actual high levels of CO and report information to a remote server 142 providing fire detection system services via the wireless network 100. Similarly, the remote server 142 may be configured to receive fire event reports and sensor data from several wireless devices (e.g., 120c and 120d) as well as provide command signals (e.g., to wake up, activate certain sensors, report data, move, and/or shutdown or go into a low-power mode or other mode). In some embodiments a server providing fire detection system services may be deployed as or included within the functionality of a network element (e.g., a server coupled to a macro base station 110a).

Wireless devices may be dispersed throughout the wireless network 100. In some embodiments, the wireless devices may be deployed in nearly any location or setting, including any industrial, commercial, or residential building, or any other suitable environment, such as a mine 150 or an industrial facility 152 (as but two of examples too numerous to illustrate, such as, a home, a parking garage, a construction site, a power plant, any factory, manufacturing facility, or fabrication facility, an office, a store, or any other suitable location or area), or an outdoor area 156 such as a park, nature preserve, or forest. In some embodiments, a wireless device may be attached to or incorporated into a vehicle such as a car 154 or any other vehicle (e.g., a boat, a motorcycle, bicycle etc.). In some embodiments, a wireless device may be deployed in, on, or near any machine, appliance, system, or device. In some embodiments, the wireless device may be deployed as, attached to, or incorporated into a wireless device that may be worn by, attached to, or implanted in a person 158 or animal. Some wireless devices may include evolved or machine-type communication (MTC) devices or evolved MTC (eMTC) IoT devices. MTC and eMTC IoT devices include, for example, robots, drones, remote devices, sensors, meters, monitors, location tags, etc., that may communicate with a base station, another device (e.g., remote device), or some other entity.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal full frame transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

A NR base station (e.g., eNB, 5G Node B, Node B, transmission reception point (TRP), access point (AP)) may correspond to one or multiple base stations. NR cells may be configured as access cell (ACells) or data only cells (DCells). For example, the radio access network (RAN) (e.g., a central unit or distributed unit) may configure the cells. DCells may be cells used for carrier aggregation or dual connectivity, but not used for initial access, cell selection/reselection, or handover. NR base stations may transmit downlink signals to IoT devices indicating the cell type. Based on the cell type indication, the IoT device may communicate with the NR base station. For example, the IoT device may determine NR base stations to consider for cell selection, access, handover (HO), and/or measurement based on the indicated cell type.

Figure 2:
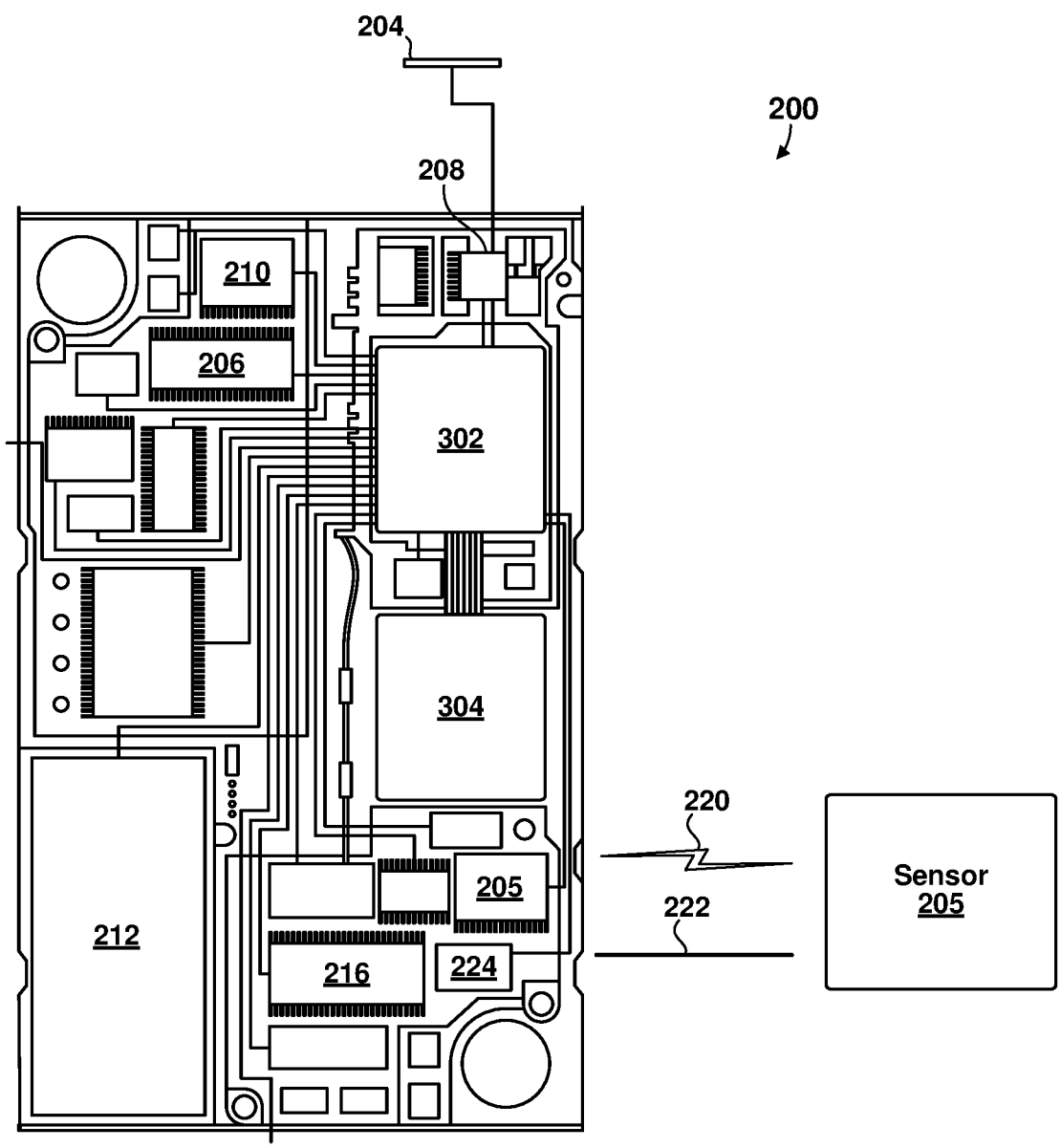
FIG. 2 is a component block diagram of a wireless device suitable for use with various embodiments.

FIG. 2 is a component block diagram of a wireless device 200 (e.g., 120c, 120d) suitable for use with various embodiments. With reference to FIGS. 1 and 2, various embodiments may be implemented on a variety of wireless devices, which may include at least the elements illustrated in FIG. 2. The wireless device 200 may include a first SOC 302 (e.g., a SOC-CPU) coupled to a second SOC 304 (e.g., a 5G capable SOC), as further described below. The first and second SOCs 302, 304 may be coupled to internal memory 206. The wireless device 200 may include or be coupled to an antenna 204 for sending and receiving wireless signals from a cellular telephone transceiver 208 or within the second SOC 304. The antenna 204 and transceiver 208 and/or second SOC 304 may support communications using various RATs, including Cat.-M1, NB-IoT, CIoT, GSM, and/or VoLTE. In some embodiments, the wireless device 200 may also include a sound encoding/decoding (CODEC) circuit 210, which digitizes sound received from a microphone into data packets suitable for wireless transmission and decodes received sound data packets to generate analog signals that are provided to a speaker to generate sound in support of voice or VoLTE calls. In some embodiments, one or more of the processors in the first and second SOCs 302, 304, one or more wireless transceivers 208 and CODEC 210 may include a digital signal processor (DSP) circuit (not shown separately). The wireless device 200 may include an internal power source, such as a battery power unit 212 or units configured to power the SOCs and transceiver(s) 208. Such wireless devices may include power management components 216 to manage charging of the battery power unit 212. In some embodiments, the power management components 216 may be included or configured as part of the battery power unit(s) 212.

The SOC 302 and/or 304 may include, be coupled to include, and/or may communicate with, one or more sensors 205. In some embodiments, one or more of the sensors 205 may be included in the wireless device 200 and may communicate with the SOC 302 and/or 304 (FIG. 3) via a communication bus (not shown). In some embodiments, one or more of the sensors 205 may be external to the wireless device 200 (e.g., external to a housing of the wireless device 200, such on the on the exterior of the housing or separate from the housing) and may communicate with the SOC 302 and/or 304 via a wired communication link 222. In some embodiments, one or more of the sensors 205 may be external to the wireless device 200 (e.g., external to a housing of the wireless device 200, such on the on the exterior of the housing or separate from the housing) and may communicate with the SOC 302 and/or 304 via a wireless communication link 220. In some embodiments, the wireless device 200 may include a communication port 224 that may support the wired communication link 222. The communication port may support communications with the one or more remote sensor(s) and/or other types of sensors 205 using, for example, Ethernet, a National Instruments 9205-type connection, or another suitable physical connection. Any number of such sensors 205 and/or other sensors of any type may be included in different implementations of the wireless device 200.

Figure 3:
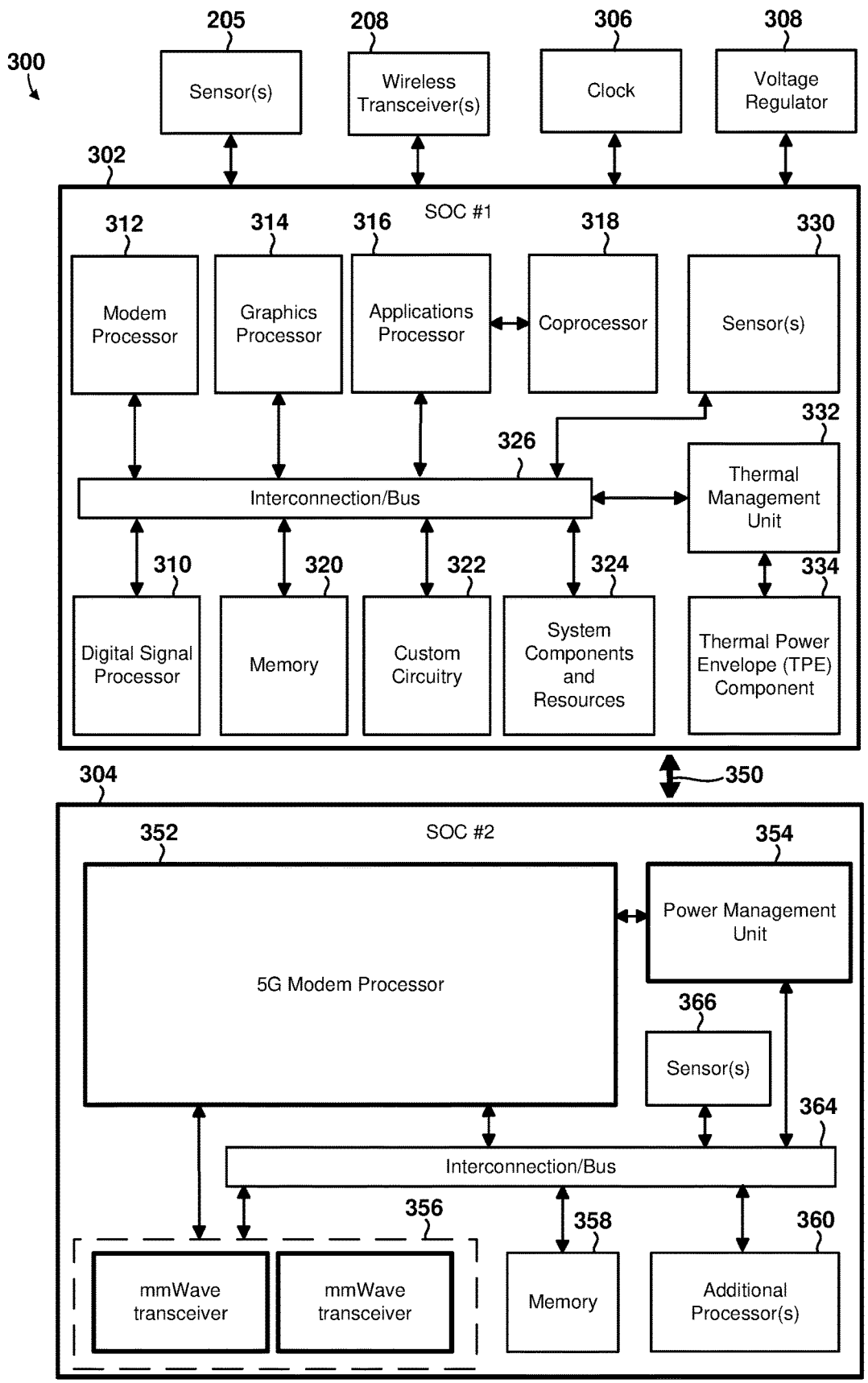
FIG. 3 is a component block diagram illustrating components of example a processing system suitable for implementing various embodiments.

FIG. 3 is a component block diagram illustrating components of an example processing system 300 suitable for implementing various embodiments. With reference to FIGS. 1-3, various embodiments may be implemented on wireless devices (e.g., 120c, 120d, 200) or communication network devices (e.g., 142) equipped with any of a number of single processor and multiprocessor computer systems, including a system-on-chip (SOC) or system in a package (SIP) that may include at least the components illustrated in FIG. 3. In some embodiments, the processing system 300 may provide all of the processing, data storage and communication capabilities required to support the mission or functionality of a given wireless device or communication network device. The same processing system 300 may be used in a variety of different types of wireless devices or communication network devices with device-specific functionality provided via programming of one or more processors within the processing system 300. Further, the processing system 300 is an example of components that may be implemented in a SIP used in wireless devices or communication network devices and more or fewer components may be included in a SIP without departing from the scope of the claims. For example, a wireless device or communication network device equipped with the SIP 300 may include a 5G modem processor that is configured to send and receive information via the wireless network 100.

The processing system 300 may include two SOCs 302, 304 coupled to a clock 306, a voltage regulator 308, various sensors 205 and one or more wireless transceivers 208. The SOC 302 may include one or more sensors 330 (e.g., temperature, voltage, current, etc.), and may communicate with one or more sensors 205. In some embodiments, the first SOC 302 may operate as a central processing unit (CPU) of the wireless device that carries out the instructions of software application programs by performing the arithmetic, logical, control and input/output (I/O) operations specified by the instructions. In some embodiments, the second SOC 304 may operate as a specialized processing unit. For example, the second SOC 304 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 302 may include a digital signal processor (DSP) 310, a modem processor 312, a graphics processor 314, an application processor 316, one or more coprocessors 318 (e.g., vector co-processor) connected to one or more of the processors, memory 320, custom circuitry 322, system components and resources 324, an interconnection/bus module 326, a thermal management unit 332, and a thermal power envelope (TPE) component 334. The second SOC 304 may include a 5G modem processor 352, a power management unit 354 (which may include one or more temperature sensors), an interconnection/bus module 364, a plurality of mmWave transceivers 356, memory 358, various additional processors 360, such as an applications processor, packet processor, etc., and one or more internal sensors 366 (e.g., accelerometers for sensing the gravity gradient, internal temperature sensors, etc.).

Each processor 310, 312, 314, 316, 318, 352, 360 may include one or more cores, and each processor/core may perform operations independent of the other processors/cores. For example, the first SOC 302 may include a processor that executes a first type of operating system (e.g., FreeBSD, LINUX, OS X, etc.) and a processor that executes a second type of operating system (e.g., Microsoft Windows 10). In addition, any or all of the processors 310, 312, 314, 316, 318, 352, 360 may be included as part of a processor cluster architecture (e.g., a synchronous processor cluster architecture, an asynchronous or heterogeneous processor cluster architecture, etc.).

The first and second SOC 302, 304 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 324 of the first SOC 302 may include power amplifiers, voltage regulators, oscillators, phase-locked loops, peripheral bridges, data controllers, memory controllers, system controllers, access ports, timers, and other similar components used to support the processors and software clients running on an IoT device. The system components and resources 324 and/or custom circuitry 322 may also include circuitry to interface with peripheral devices, such as cameras, electronic displays, wireless communication devices, external memory chips, etc.

The first and second SOC 302, 304 may communicate via an interconnection/bus module 350. The various processors 310, 312, 314, 316, 318, may be interconnected to one or more memory elements 320, system components and resources 324, and custom circuitry 322, and thermal management unit 332 via an interconnection/bus module 326. Similarly, the processors 352, 360 may be interconnected to the power management unit 354, the mmWave transceivers 356, memory 358, and various additional processors 360 via the interconnection/bus module 364. The interconnection/bus module 326, 350, 364 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 302, 304 may further include an input/output module (not illustrated) for communicating with resources external to the SOC, such as a clock 306, the voltage regulator 308, sensors 205 and wireless transceiver(s) 208. The resources external to the SOC (e.g., clock 306, voltage regulator 308, sensor(s) 205, and wireless transceiver(s) 208) may be shared by two or more of the internal SOC processors/cores.

Figure 4:
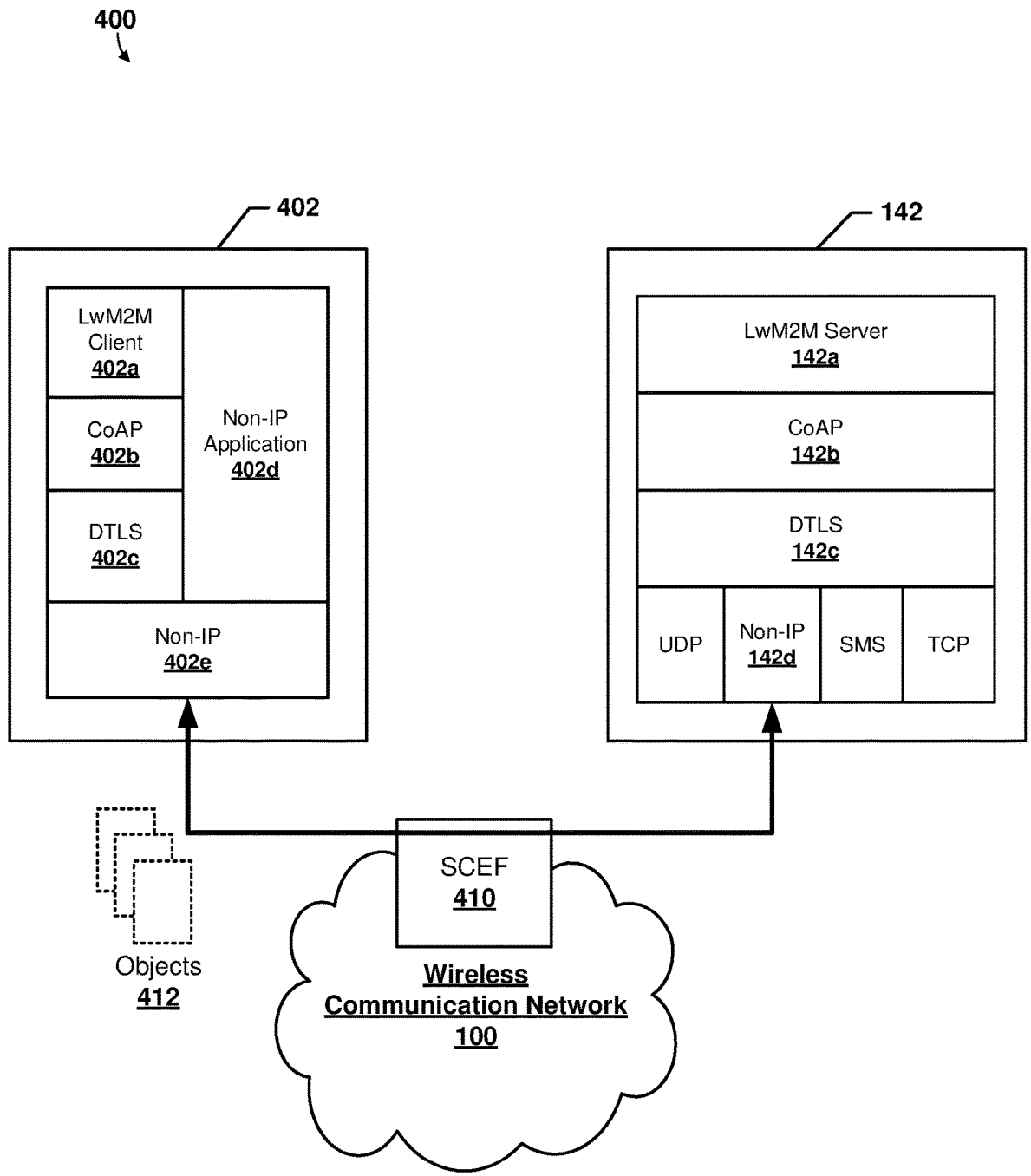
FIG. 4 is a block diagram illustrating an example Non-IP Data Delivery (NIDD) data call architecture suitable for use with various embodiments.

FIG. 4 illustrates an example Non-IP Data Delivery (NIDD) data call architecture 400 suitable for use with various embodiments. With reference to FIGS. 1-4, the architecture 400 shows an example of a NIDD data call between a wireless device 402 (e.g., wireless devices 120c, 120d, 200, 300) and a server 142. The architecture 400 is discussed with reference to LwM2M, but LwM2M is merely an example of an application of a NIDD data call used to illustrate aspects of the architecture 400. Other protocols, such as other OMA protocols or the like may be used to establish a NIDD data call and the architecture 400 may apply to non-LwM2M NIDD data calls. The wireless device 402 and the server 142 may be configured to communicate using NIDD. As an example, the wireless device 402 may be a LwM2M client device. As an example, the server 142 may include a LwM2M server 142a, such as a bootstrap server as defined by LwM2M or an LwM2M server that is not a bootstrap server. In some embodiments, the server 142 may be an application server.

A Service Capability Exposure Function (SCEF) 410 enables NIDD communication between the wireless device 402 and the server 142. The SCEF 410 enables devices such as the wireless device 402 and the application server 142 to access certain communication services and capabilities, including NIDD. The SCEF 410 may support a raw data download (RDD) service. While illustrated as in communication with one server 142, the SCEF 410 may route traffic to multiple servers each identified by their own respective destination port when using the RDS (Reliable Data Service) protocol. In this manner, a single NIDD data call through the SCEF 410 may include multiplexed traffic intended for multiple different destinations.

In some embodiments, the wireless device 402 may be configured with an LwM2M client 402a that uses the LwM2M device management protocol. The LwM2M device management protocol defines an extensible resource and data model. The LwM2M client 402a may employ a transport protocol such as Constrained Application Protocol (CoAP) 402b to enable, among other things reliable and low overhead transfer of data. The wireless device 402 may employ a communication security protocol such as Datagram Transport Layer Security (DTLS) 402c. DTLS in particular may provide security for datagram-based applications. One such application may be a Non-IP Application 402d. The Non-IP Application 402d may utilize a non-IP protocol 402e to structure non-IP communications.

In some embodiments, the server 142 may be configured with the LwM2M server 142a, a transfer protocol such as CoAP 142b, and a security protocol such as DTLS 142c. The application server 142 may be configured to utilize a variety of communication protocols, such as non-IP protocol 142d, as well as other communication protocol such as UDP, SMS, TCP, and the like.

As an example, the wireless device 402 may be configured as a unitary device powered by battery power unit 212, and may be configured for an operational life of months or years. Typical protocols for establishing Internet protocol (IP) data bearers are generally power hungry. In contrast, NIDD may enable the wireless device 402 to communicate small amounts of data by a control plane, rather than a user plane, without the use of an IP stack. NIDD may have particular application in Cat.-M1, NB-IoT and CIoT communications to enable constrained devices to communicate via a cellular network and send or receive small amounts of data per communication, such as on the order of hundreds of bytes, tens of bytes, or smaller. NIDD may enable the wireless device 402 to embed a small amount of data in a container or object 412 without use of an IP stack, and to send the container or object 412 to the server 142 via the SCEF 410. Similarly, the wireless device 402 may receive containers or objects 412 that define services and capabilities of the network 100 the wireless device 402 may be connected to enable the wireless device 402 to reach the SCEF 410 and server 142. For example, such containers or objects 412 that define services and capabilities may include various OMA objects, such as an APN connection profile object (Object ID 11), a LwM2M server object (Object ID 1), a LwM2M security object (Object ID 0), etc.

In some embodiments, the wireless device 402 may support RDS in a NIDD data call. The wireless device 402 may multiplex uplink traffic for different servers 142 by sending the uplink traffic with a pair of source and destination port numbers and an Evolved Packet System (EPS) bearer ID. The SCEF 410 may receive uplink traffic from the wireless device 402 and may route the uplink traffic to the appropriate server, such as server 142 or any other server, based on the destination port number indicated for the uplink traffic.

FIG. 5A illustrates aspects of an example anomaly port object 500a according to various embodiments. Although the anomaly port object 500a is discussed in view of the LwM2M standard, any suitable object or arrangement of information may be used in various embodiments.

With reference to FIGS. 1-5A, as noted above, NIDD may enable the wireless device (e.g., 120c, 120d, 200, 300, 402) or communication network device (e.g., server 142) to embed a small amount of data in a container or object without use of an IP stack, and to send the container or object to another device. By using object(s) with defined resources, a wireless device or communication network device may construct a message using index references to resource definitions with a very small amount of data (e.g., hundreds of bytes, tens of bytes, or a few bytes) that conveys complex and varied information to a receiving device (e.g., a server).

In some embodiments, a wireless device or network communication device may use the anomaly port object 500a to provide information about or to configure another wireless device with information about a communication port for sending and/or receiving anomaly notification messages. The anomaly port object 500a includes resources that may be indexed, for example, by a Resource Definition ID (such as Resource Definition ID 31). The resource definition may include a name (e.g., Emergency Port) and an indicator of a permissible operation. Examples of permissible operations may include Read (R), Read-Write (RW), or Execute (E), or other operations, as may be defined in the LwM2M standard, for example. Each resource definition may also include a permitted number of instances (e.g., "single"), whether an operation is Mandatory or Optional, and a data type where applicable (e.g., "integer"). Each resource definition may also include a range or enumeration of the relevant information for that resource (e.g., 1.65534) and units, if applicable. The resource definition may also include a description of the meaning of a value or values associated with each resource definition.

FIG. 5B illustrates transport layer anomaly codes 500b according to various embodiments. Although the transport layer anomaly codes 500b are discussed in view of the CoAP protocol, any suitable protocol or arrangement of information may be used in various embodiments.

With reference to FIGS. 1-5B, in some protocols, such as CoAP, request and response semantics are carried in messages that may include method codes, such as the method codes 500b. The method codes 500b are configured to indicate various operations using very small messages. Further, the method codes 500b may indicate that information requested and or response messages including information should be handled as anomaly notification messages, which may be associated with and/or handled with a higher priority than non-prioritized messages.

For example, the method code 0.05 may signify an "EMERGENCY-GET" operation, i.e., a request for information, which should be accorded an anomaly notification priority. Similarly, the method codes 0.06, 0.07, and 0.08, may signify "EMERGENCY-POST," "EMERGENCY-PUT," and "EMERGENCY-DELETE" operations, which should accorded an anomaly notification priority. As another example, an option number such as "128" may signify an instruction or indication that messages and other communications should be associated with or handled according to anomaly notification priority, i.e., higher than non-prioritized messages or other communications.

Figure 6:
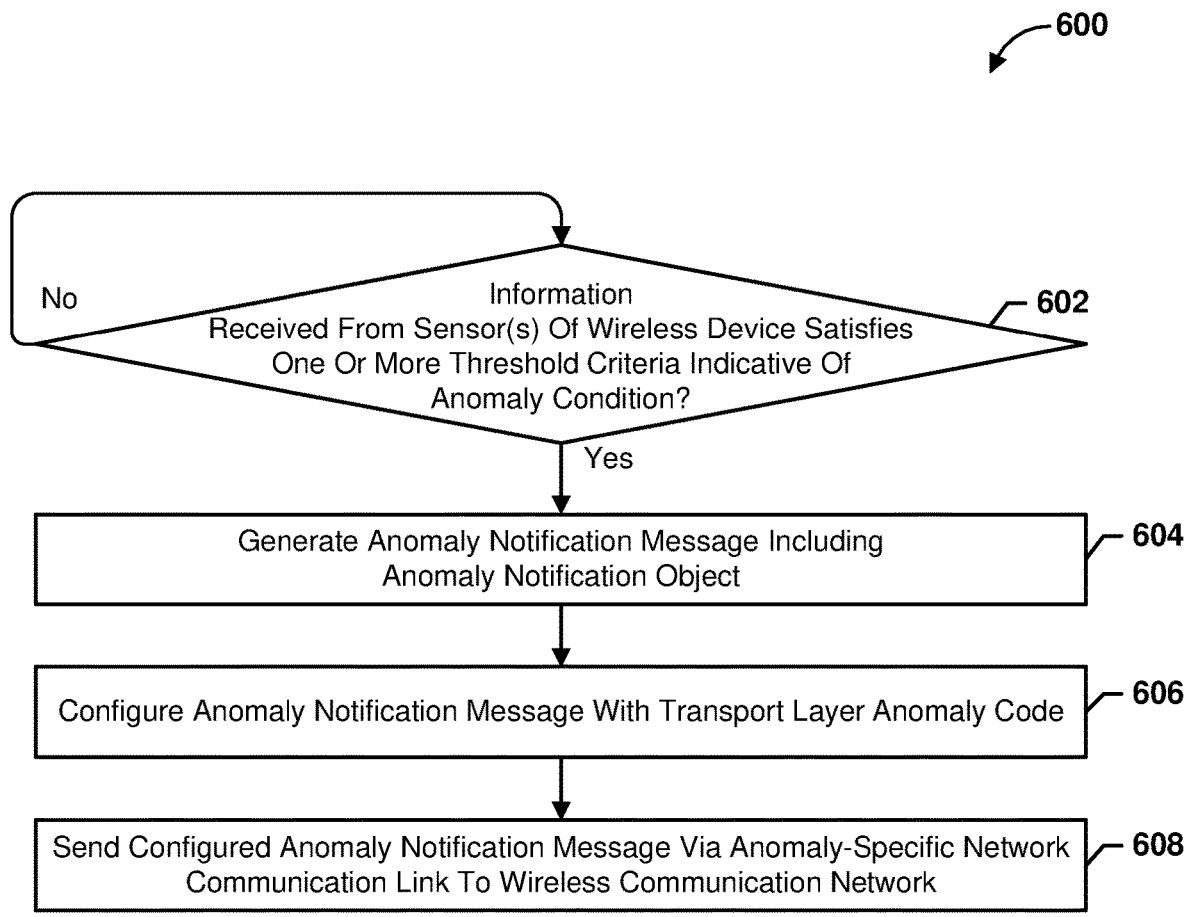
FIG. 6 is a process flow diagram illustrating a method for communicating an anomaly message to a wireless communication network device according to some embodiments

FIG. 6 is a process flow diagram illustrating a method 600 that may be performed by a processor of a wireless device for communicating an anomaly message to a wireless communication network device according to some embodiments. With reference to FIGS. 1-6, the method 600 may be implemented in hardware components and/or software components of a wireless device (e.g., 120c, 120d, 200, 300, 402) the operation of which may be controlled by one or more processors (e.g., the processors 312, 314, 316, 318, 352, 366). In some embodiments, the wireless device may include one or more sensors (e.g., 205) coupled to the one or more processors.

In determination block 602, the processor may determine whether information received from one or more sensors of the wireless device satisfies one or more threshold criteria indicative of an anomaly condition. In some embodiments, the one or more threshold criteria may indicate a value or measurement that is greater than, or greater than or equal to, a normal range for such value or measurement.

In response to determining that the information received from one or more sensors of the wireless device does not satisfy one or more threshold criteria indicative of an anomaly condition (i.e., determination block 602="No"), the processor may again perform the operations of determination block 602.

In response to determining that the information received from one or more sensors of the wireless device satisfies one or more threshold criteria indicative of an anomaly condition (i.e., determination block 602="Yes"), the processor may generate an anomaly notification message including an anomaly notification object in block 604. In some embodiments, the anomaly notification object may include an LwM2M object.

In block 606, the processor may configure the anomaly notification message with a transport layer anomaly code (e.g., 502b). In some embodiments, the transport layer anomaly code may include a CoAP emergency code.

In block 608, the processor may send the configured anomaly notification message via an anomaly-specific network communication link to a wireless communication network. In some embodiments, the processor may send the configured anomaly notification message via an anomaly-specific packet data connection (PDC) to the wireless communication network.

Figure 7A:
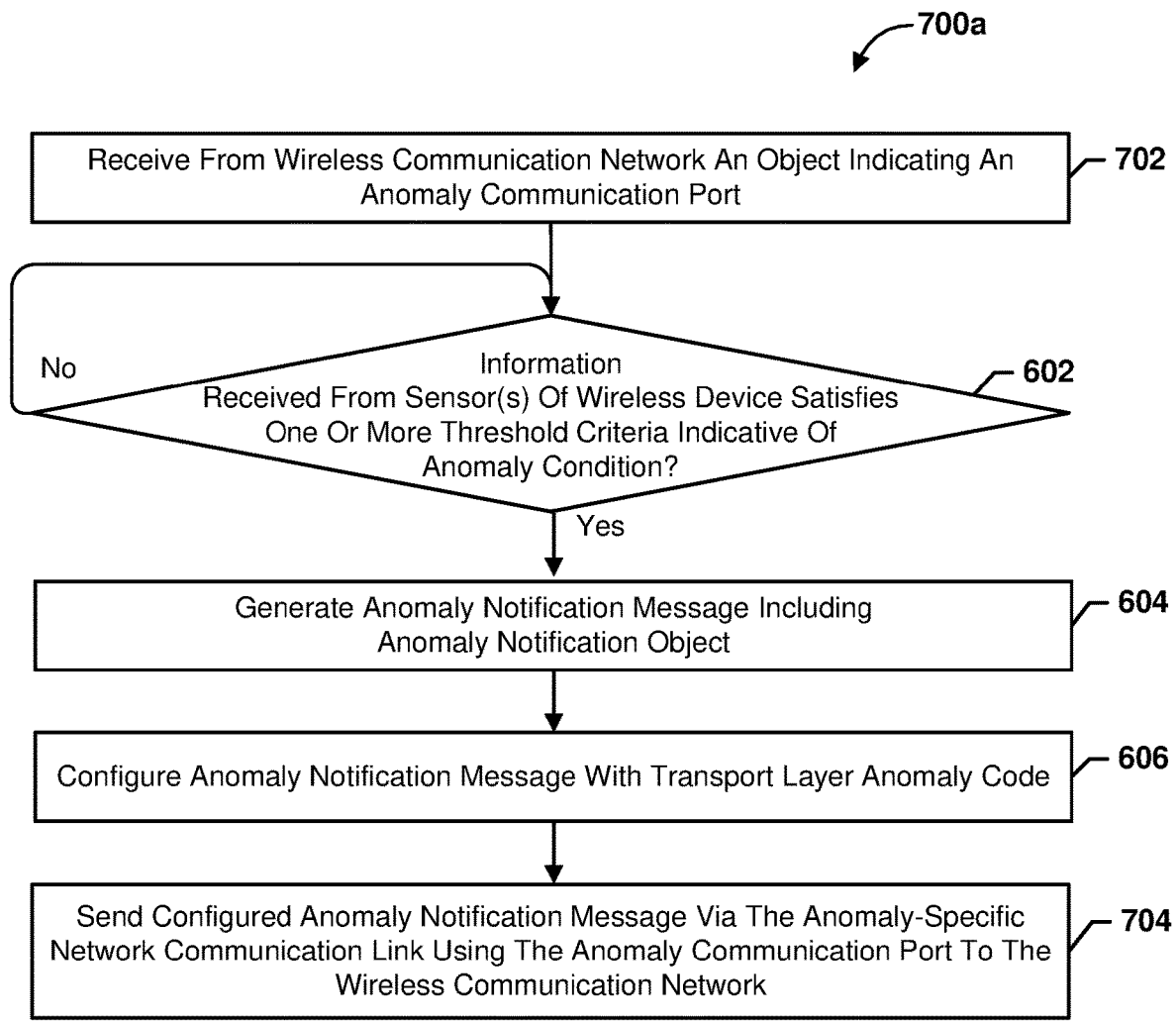
FIGS. 7A and 7B are process flow diagrams illustrating operations that may be performed as part of the method for communicating an anomaly message to a wireless communication network device according to some embodiments.
Figure 7B:
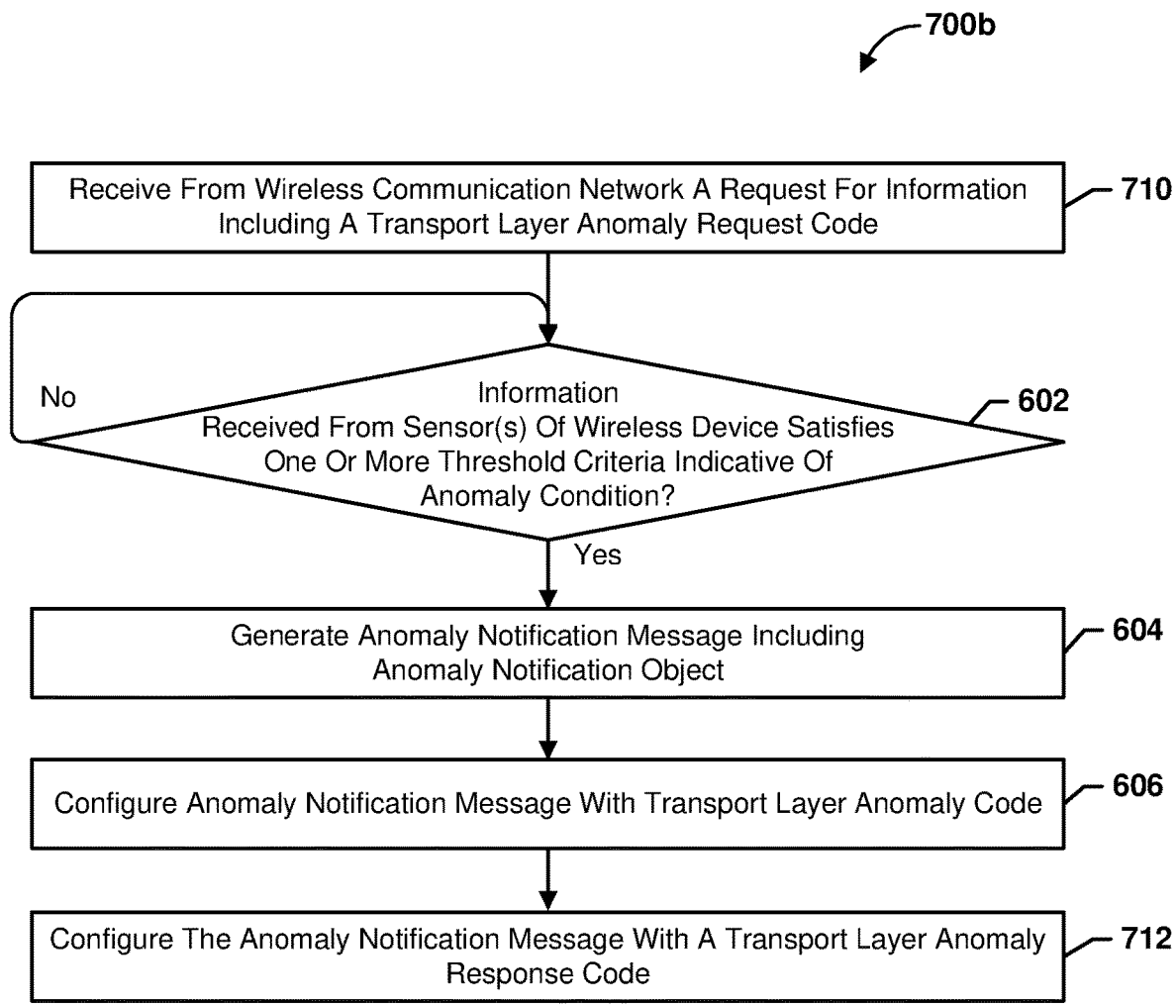

FIGS. 7A and 7B are process flow diagrams illustrating operations 700a and 700b that may be performed by a processor of a wireless device as part of the method 600 according to some embodiments. With reference to FIGS. 1-7B, the operations 700a and 700b may be implemented in hardware components and/or software components of a wireless device (e.g., 120c, 120d, 200, 300, 402) the operation of which may be controlled by one or more processors (e.g., the processors 312, 314, 316, 318, 352, 366). In some embodiments, the wireless device may include one or more sensors (e.g., 205) coupled to the one or more processors.

Referring to FIG. 7A, in block 702, the processor may receive from the wireless communication network an object indicating an anomaly communication port. For example, the processor may receive from a communication network device a configuration message that includes an object (e.g., 500a) indicating the anomaly communication port. In some embodiments, the processor may store information about the anomaly communication port in memory, such as in a secure memory or trust zone.

The processor may perform the operations of determination block 602, block 604, and block 606 as described.

In block 704, the processor may send the configured anomaly notification message via the anomaly-specific network communication link using the anomaly communication port to the wireless communication network. For example, the processor may access the stored information about the anomaly communication port, and may use the anomaly communication port information to send the anomaly notification message.

Referring to FIG. 7B, in block 710, the processor may receive from the wireless communication network a request for information comprising a transport layer anomaly request code (e.g., 700b). In some embodiments, the transport layer anomaly request code may include a CoAP anomaly (or emergency) request code.

The processor may perform the operations of determination block 602, block 604, and block 606 of the method 600 as described.

In block 712, the processor may configure the anomaly notification message with a transport layer anomaly response code (e.g., 700b). In some embodiments, the transport layer anomaly response code may include a CoAP anomaly (or emergency) response code.

Figure 8:
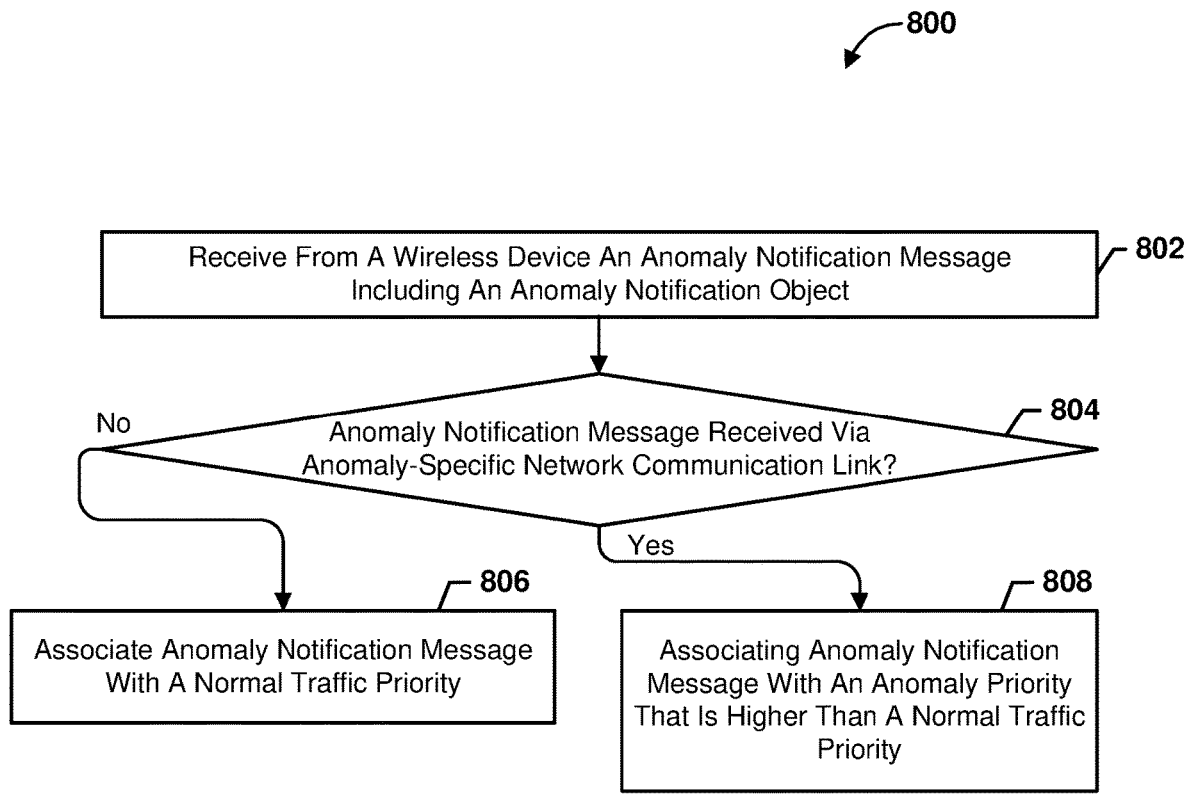
FIG. 8 is a process flow diagram illustrating a method for communicating an anomaly message to a wireless communication network device according to some embodiments.

FIG. 8 is a process flow diagram illustrating a method 800 that may be performed by a processor of a communication network device for communicating a wireless to a wireless communication network device according to some embodiments. With reference to FIGS. 1-8, the method 800 may be implemented in hardware components and/or software components of a communication network device (e.g., server 142) the operation of which may be controlled by one or more processors (e.g., the processors 312, 314, 316, 318, 352, 366).

In block 802, the processor may receive from a wireless device an anomaly notification message comprising an anomaly notification object.

In determination block 804, the processor may determine whether the anomaly notification message was received via an anomaly-specific network communication link.

In response to determining that anomaly notification message was not received via an anomaly-specific network communication link (i.e., determination block 804="No"), the processor may associate the anomaly notification message with a normal traffic priority in block 806. In some embodiments, the processor may determine whether the anomaly notification message was received via an anomaly-specific PDC.

In response to determining that anomaly notification message was received via an anomaly-specific network communication link (i.e., determination block 804="Yes"), the processor may associate the anomaly notification message with an anomaly priority that is higher than a normal traffic priority in block 808. In some embodiments, associating the anomaly notification message with an anomaly priority that is higher than a normal traffic priority may include routing the anomaly notification message according to the anomaly priority.

Figure 9A:
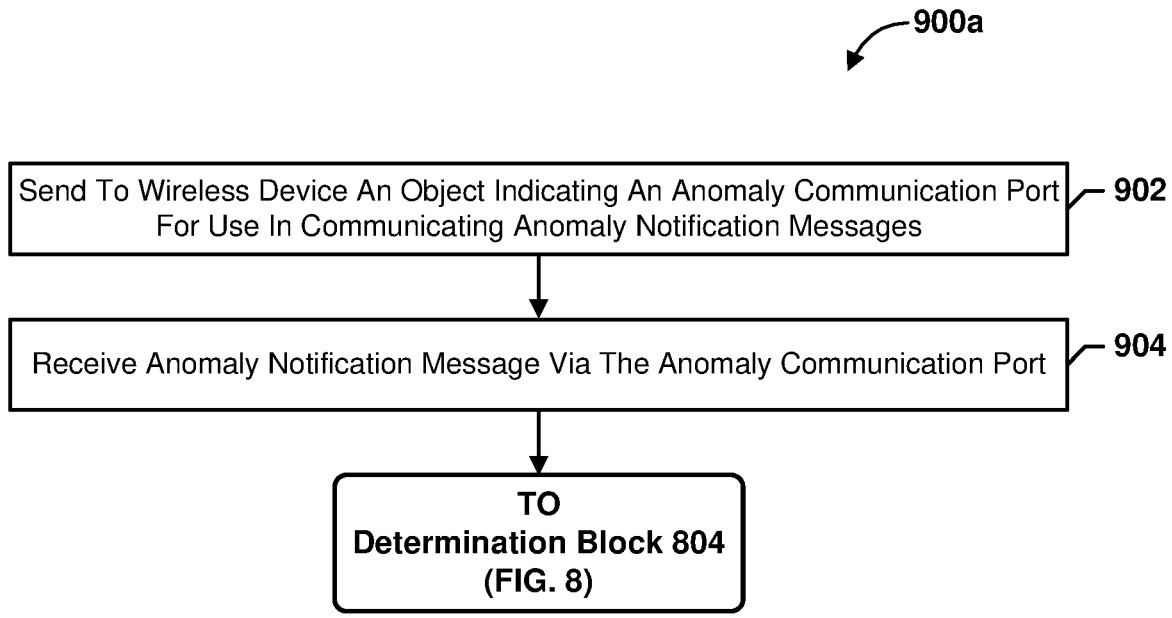
FIGS. 9A and 9B are process flow diagrams illustrating operations that may be part of the method for communicating an anomaly message to a wireless communication network device according to some embodiments.
Figure 9B:
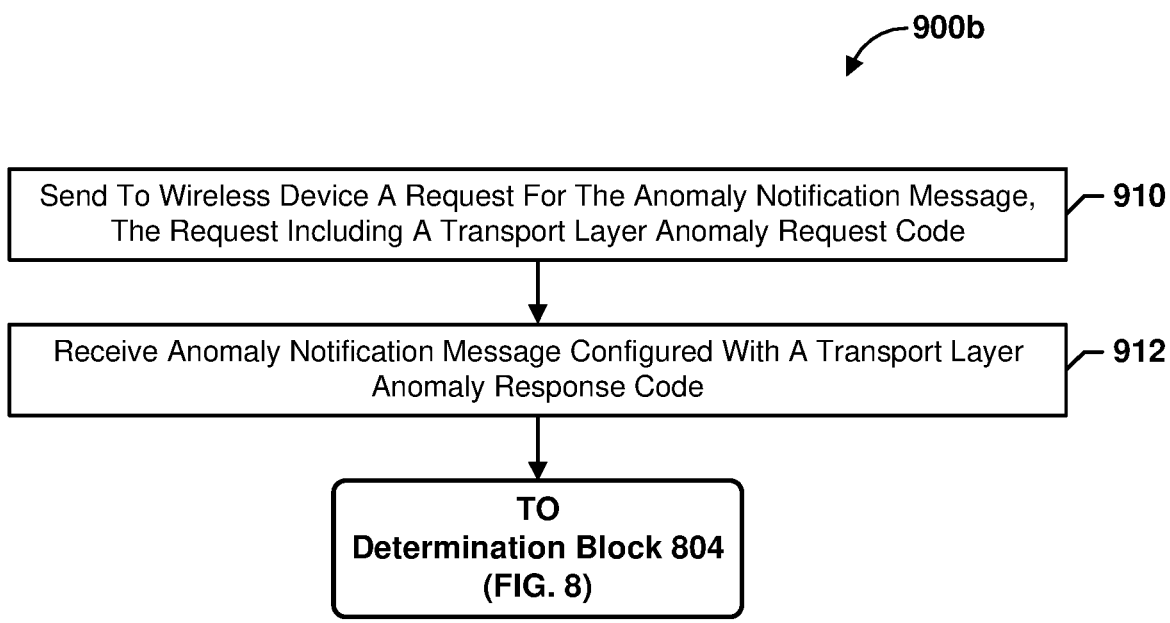

FIGS. 9A and 9B are process flow diagrams illustrating operations 900a and 900b that may be performed by a processor of a wireless device as part of the method 800 according to some embodiments. With reference to FIGS. 1-9B, the operations 900a and 900b may be implemented in hardware components and/or software components of a communication network device (e.g., server 142) the operation of which may be controlled by one or more processors (e.g., the processors 312, 314, 316, 318, 352, 366).

Referring to FIG. 9A, in block 902, the processor may send to the wireless device an object indicating an anomaly communication port for use in communicating anomaly notification messages. For example, the processor may send the object 500a indicating the anomaly communication port to the wireless device.

In block 904, the processor may receive the anomaly notification message via the anomaly communication port.

The processor may proceed to perform the operations of determination block 804 of the method 800 as described.

Referring to FIG. 9B, in block 910, the processor may send to the wireless device a request for the anomaly notification message, the request comprising a transport layer anomaly request code (e.g., one of the transport layer codes 500b).

In block 912, the processor may receive the anomaly notification message configured with a transport layer anomaly response code.

The processor may proceed to perform the operations of determination block 804 (FIG. 8) as described.

Figure 10:
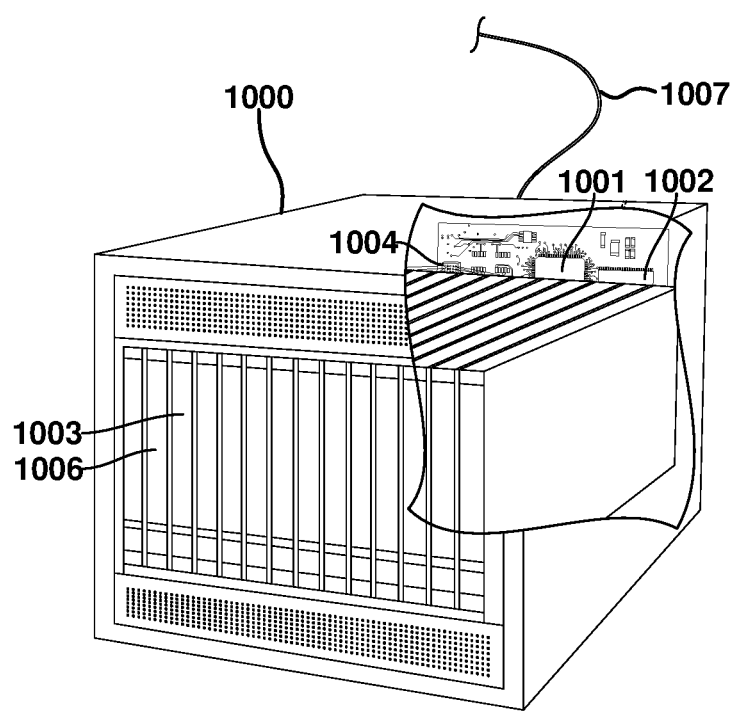
FIG. 10 is a component diagram of an example communication network device suitable for use with the various embodiments.

FIG. 10 is a component diagram of an example communication network device 1000 suitable for use with the various embodiments. With reference to FIGS. 1-10, various embodiments (including, but not limited to, embodiments discussed above with reference to FIGS. 1-9B) may also be implemented on any of a variety of communication network devices (e.g., a server), such as the communication network device 1000. Such a communication network device 1000 may include a processor 1001 coupled to volatile memory 1002 and a large capacity nonvolatile memory, such as a disk drive 1003. The communication network device 1000 may also include a floppy disc drive, compact disc (CD) or digital versatile disc (DVD) drive 1006 coupled to the processor 1001. The communication network device 1000 may also include one or more network transceivers 1004, such as a network access port, coupled to the processor 1001 for establishing network interface connections with a wireless communication network 1007, such as a local area network coupled to other announcement system computers and servers, the Internet, the public switched telephone network, and/or a cellular network (e.g., CDMA, TDMA, GSM, PCS, 3G, 4G, 5G, LTE, or any other type of cellular network).

The processors used in any embodiments may be any programmable microprocessor, microcomputer or multiple processor chip or chips that can be configured by software instructions (applications) to perform a variety of functions, including the functions of the various embodiments described in this application. In some wireless devices, multiple processors may be provided, such as one processor dedicated to wireless communication functions (e.g., in SOC 304) and one processor dedicated to running other applications (e.g., in SOC 302). Typically, software applications may be stored in the internal memory (e.g., 206, 320, 358) before they are accessed and loaded into a processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on an IoT device and the IoT device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (IDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the methods and operations 600, 700a, 700b, 800, 900a, and 900b may be substituted for or combined with one or more operations of the methods and operations 600, 700a, 700b, 800, 900a, and 900b.

Implementation examples are described in the following paragraphs. While some of the following implementation examples are described in terms of example methods, further example implementations may include: the example methods discussed in the following paragraphs implemented by a base station including a processor configured with processor-executable instructions to perform operations of the methods of the following implementation examples; the example methods discussed in the following paragraphs implemented by a base station including means for performing functions of the methods of the following implementation examples; and the example methods discussed in the following paragraphs may be implemented as a non-transitory processor-readable storage medium having stored thereon processor-executable instructions configured to cause a processor of a base station to perform the operations of the methods of the following implementation examples.

Example 1. A method performed by a processor of a wireless device for communicating an anomaly notification message to a wireless communication network, including determining whether information received from one or more sensors of the wireless device satisfies one or more threshold criteria indicative of an anomaly condition; generating an anomaly notification message including an anomaly notification object in response to determining that the received information satisfies one or more threshold criteria indicative of the anomaly condition; configuring the anomaly notification message with a transport layer anomaly code; and sending the configured anomaly notification message via an anomaly-specific network communication link to a wireless communication network.

Example 2. The method of example 1, in which the anomaly notification object includes a Lightweight Machine-to-Machine (LwM2M) object.

Example 3. The method of any of examples 1 or 2, further including receiving from the wireless communication network an object indicating an anomaly communication port, in which sending the configured anomaly notification message via the anomaly-specific network communication link to the wireless communication network includes sending the configured anomaly notification message via the anomaly-specific network communication link using the anomaly communication port to the wireless communication network.

Example 4. The method of any of examples 1-3, in which the transport layer anomaly code includes a Constrained Application Protocol (CoAP) emergency code.

Example 5. The method of any of examples 1-4, further including receiving from the wireless communication network a request for information including a transport layer anomaly request code, in which configuring the anomaly notification message with a transport layer anomaly code includes configuring the anomaly notification message with a transport layer anomaly response code.

Example 6. The method of any of examples 1-5, in which sending the configured anomaly notification message via an anomaly-specific network communication link to the wireless communication network includes sending the configured anomaly notification message via an anomaly-specific packet data connection (PDC) to the wireless communication network.

Example 7. A method performed by a processor of a communication network device for communicating an anomaly notification message to a wireless communication network, including receiving from a wireless device an anomaly notification message including an anomaly notification object; determining whether the anomaly notification message was received via an anomaly-specific network communication link; and associating the anomaly notification message with an anomaly priority that is higher than a normal traffic priority in response to determining that the anomaly notification message was received via the anomaly-specific network communication link.

Example 8. The method of example 7, in which associating the anomaly notification message with an anomaly priority that is higher than a normal traffic priority includes routing the anomaly notification message according to the anomaly priority.

Example 9. The method of any of examples 7 or 8, in which the wireless device is an anomaly detection device configured to generate the anomaly notification object as a Lightweight Machine-to-Machine (LwM2M) object.

Example 10. The method of any of examples 7-9, further including sending to the wireless device an object indicating an anomaly communication port for use in communicating anomaly notification messages; in which receiving from the wireless device the anomaly notification message including an anomaly notification object includes receiving the anomaly notification message via the anomaly communication port.

Example 11. The method of any of examples 7-10, further including sending to the wireless device a request for the anomaly notification message, the request including a transport layer anomaly request code; in which receiving from a wireless device an anomaly notification message including an anomaly notification object includes receiving the anomaly notification message configured with a transport layer anomaly response code.

Example 12. The method of any of examples 7-11, in which determining whether the anomaly notification message was received via an anomaly-specific network communication link includes determining whether the anomaly notification message was received via an anomaly-specific packet data connection (PDC).

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a communication network device for processing an anomaly notification message, comprising:
    receiving from a wireless device an anomaly notification message comprising an anomaly notification object;
    determining whether the anomaly notification message was received via an anomaly-specific network communication link; and
    associating the anomaly notification message with an anomaly priority that is higher than a normal traffic priority in response to determining that the anomaly notification message was received via the anomaly-specific network communication link.

2. The method of claim 1, wherein associating the anomaly notification message with an anomaly priority that is higher than a normal traffic priority comprises routing the anomaly notification message according to the anomaly priority.

3. The method of claim 1, wherein the wireless device is an anomaly detection device configured to generate the anomaly notification object as a Lightweight Machine-to-Machine (LwM2M) object.

4. The method of claim 1, further comprising:
    sending to the wireless device an object indicating an anomaly communication port for use in communicating anomaly notification messages;
    wherein receiving from the wireless device the anomaly notification message comprising an anomaly notification object comprises receiving the anomaly notification message via the anomaly communication port.

5. The method of claim 1, further comprising:
    sending to the wireless device a request for the anomaly notification message, the request comprising a transport layer anomaly request code;
    wherein receiving from a wireless device an anomaly notification message comprising an anomaly notification object comprises receiving the anomaly notification message configured with a transport layer anomaly response code.

6. The method of claim 1, wherein determining whether the anomaly notification message was received via an anomaly-specific network communication link comprises determining whether the anomaly notification message was received via an anomaly-specific packet data connection (PDC).

7. A communication network device, comprising:
    a processor configured with processor-executable instructions to:
        receive from a wireless device an anomaly notification message comprising an anomaly notification object;
        determine whether the anomaly notification message was received via an anomaly-specific network communication link; and
        associate the anomaly notification message with an anomaly priority that is higher than a normal traffic priority in response to determining that the anomaly notification message was received via the anomaly-specific network communication link.

8. The communication network device of claim 7, wherein the processor is further configured with processor-executable instructions to route the anomaly notification message according to the anomaly priority.

9. The communication network device of claim 7, wherein the processor is further configured with processor-executable instructions such that the wireless device is an anomaly detection device configured to generate the anomaly notification object as a Lightweight Machine-to-Machine (LwM2M) object.

10. The communication network device of claim 7, wherein the processor is further configured with processor-executable instructions to:
  send to the wireless device an object indicating an anomaly communication port for use in communicating anomaly notification messages; and
  receive the anomaly notification message via the anomaly communication port.

11. The communication network device of claim 7, wherein the processor is further configured with processor-executable instructions to:
  send to the wireless device a request for the anomaly notification message, the request comprising a transport layer anomaly request code; and
  receive the anomaly notification message configured with a transport layer anomaly response code.

12. The communication network device of claim 7, wherein the processor is further configured with processor-executable instructions to determine whether the anomaly notification message was received via an anomaly-specific packet data connection (PDC).

* * * * *